United States Patent
Alderton

[15] 3,695,733
[45] Oct. 3, 1972

[54] BRAKING SYSTEMS

[72] Inventor: Howard Kenneth Alderton, Luton, England

[73] Assignee: Cam Gears Limited, Hertfordshire, England

[22] Filed: Feb. 17, 1970

[21] Appl. No.: 12,092

[30] Foreign Application Priority Data

Feb. 18, 1969 Great Britain............8,697/69
Dec. 12, 1969 Great Britain..........60,673/69

[52] U.S. Cl. .............303/21 A, 188/181 T, 188/346, 303/22 R
[51] Int. Cl. ...........................B60t 8/18, B60t 8/00
[58] Field of Search.......303/22, 21; 188/346, 181 T, 188/346

[56] References Cited

UNITED STATES PATENTS

| | | | |
|---|---|---|---|
| 1,926,296 | 9/1933 | Merchie | 303/21 A |
| 2,736,395 | 2/1956 | Keeler | 188/181 A |
| 3,537,759 | 11/1970 | Du Bois | 303/21 CH |

*Primary Examiner*—Milton Buchler
*Assistant Examiner*—John J. McLaughlin
*Attorney*—Hill, Sherman, Meroni, Gross & Simpson

[57] ABSTRACT

A braking system in which pressure from a master cylinder acting in slave cylinders at the brakes carries initial or low-force braking dependent on the driver's pedal force, there being a mechanical feed-back mechanism which increases the braking pressure in accordance with the mechanical force resulting from brake reaction in the vehicle, e.g. torque or drag. The hydraulic braking force is therefore augmented by feedback force and in that sense provides a servo effect.

9 Claims, 9 Drawing Figures

INVENTOR
HOWARD KENNETH ALDERTON

INVENTOR
HOWARD KENNETH ALDERTON

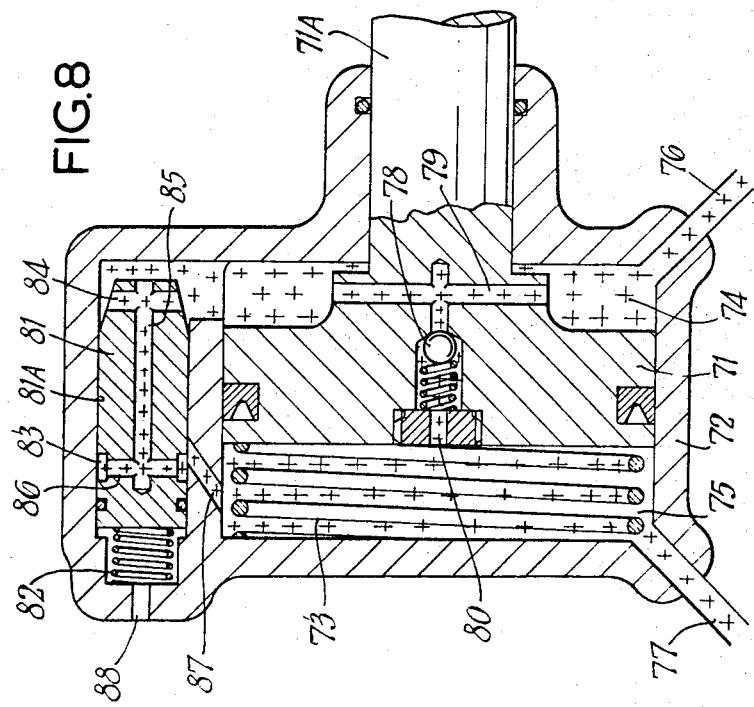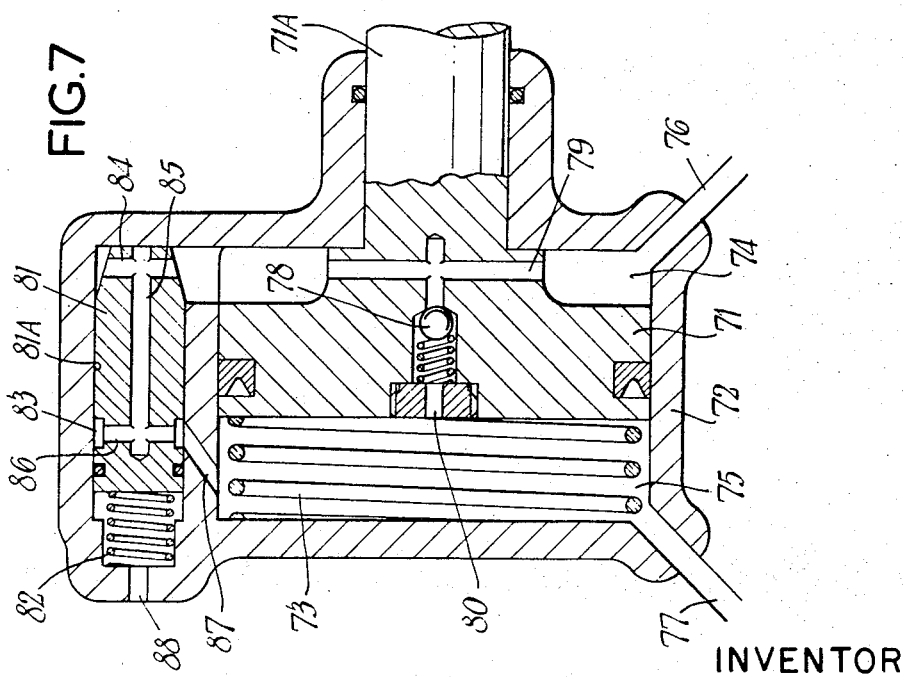

BRAKING SYSTEMS

BACKGROUND OF THE INVENTION

1. Field of the Invention

The invention relates to vehicle braking and suspension as applied to road or other wheeled vehicles and to aircraft with wheel undercarriages. More specifically, the invention relates to a braking system which is modulated by the retarding force on the vehicle due to braking, i.e., skid control.

2. Description of the Prior Art

It has heretofore been common practice in shoe-type brakes to provide a so-called "self servo" effect whereby a brake shoe has its effective brake pressure increased by its own response to an initiated braking force. This servo effect is independent of the load of the wheel on the ground, and largely independent of the friction between the wheel and the road.

With such prior art braking systems, an instability can arise. If a "false signal" is fed back, for example, by a road wheel encountering a hump or other significant variation in the road, there will result a sudden and maybe dangerous rise or variation of the braking force of any one or probably two or more wheels. In some circumstances, this could result in the application of braking with no initiation by the driver, that is to say entirely uncontrolled braking might arise in an extreme case. This is potentially very dangerous especially if the applied braking force is asymmetrical.

In brake systems with provision for anti-skid, various approaches have been made to the problem. In one, there is provided sensitivity to rotation of the wheel — which signals release of the brake if wheel rotation stops or slows up intolerably. In another, there is provided sensitivity to brake torque — which signals release of the brake if its torque reaction falls below a given limit, such fall being an indication of the sharp decrement of wheel/road adhesion which accompanies wheel-braking. Combinations of these two approaches have also been proposed. In such prior art arrangements, the object has been to modulate the brake torque in the sense of reducing it in response to a signal that road adhesion has decreased.

SUMMARY OF THE INVENTION

In accordance with the principles of the present invention, the main parameters which are considered in achieving maximum vehicle retardation are the force exerted by the driver, the force (if any) applied by way of servo-effect, the effectiveness of the brake itself, i.e., its maximum available friction torque, the wheel/road adhesion which is, in fact, a function of the coefficient of friction momentarily and the vertical load of the wheel on the road.

Such main parameters can be broken down by further analysis. For example, a road surface affording a high coefficient to a good tire may have the effective adhesion much reduced if there is a scatter of loose gravel, or a layer of water which may not only lubricate but even cause aquaplaning.

Again, there is inevitably a partial failure of adhesion if a tire of substantial breadth of tread is traveling in a curve, because it must then be partially skidding and skidding involves the sharp decrement of adhesion above mentioned. Thus, the maximum braking which can be achieved in any given steady condition is less when the wheel is following a curved path than when it is running straight. Yet again, the vertical loads of the two front or back wheels will vary differentially if the wheel is covering at any substantial speed, the outer wheel being more highly loaded than the inner by reason of the rolling tendency of the vehicle under centrifugal effect and also traveling faster. In this case, other parameters being constant, the outer wheel will have greater adhesion than the inner so the inner will "lock" and skid, before the outer, but by reason of skidding will lose its directional effect thus increasing the lateral load on the outer and of course to cause a lateral skid of the vehicle.

In accordance with this invention, the servo action is modulated as a function of the force exercised between a wheel and its immediately associated suspension elements, and the rest of the vehicle, such force involving the brake-to-vehicle reaction itself, which is a measure of the brake torque transmitted by the suspension system and also involving the load of the wheel on the road, which may be referred to herein as "wheel load."

According to the invention, a fluid pressure vehicle brake system of the kind including a master piston exerting driver's fluid pressure which is transmitted to brake-actuating slave cylinder means, further comprises a vehicle-suspension element which is movable in response to the reaction force between a vehicle wheel and the ground occasioned by braking, such movement energizing a secondary servo piston arranged to generate servo pressure proportional to such reaction force, which servo pressure is added to the driver's pressure when the servo pressure exceeds the driver's pressure.

The servo piston is made to be responsive in its movements to a vehicle suspension element which bears part of the weight of the vehicle and which is arranged to be movable in response to the drag of at least one vehicle wheel. The suspension element may transmit to the servo piston force which is a function of the vertical load sustained by the element, i.e., part of the vehicle weight less the weight of the unsprung parts. The invention also includes a pressure-operated valve which is preferably in the form of a piston-like spool, which is acted upon by driver's pressure in such a manner that this valve when the driver's pressure exceeds a predetermined gauge value cuts off the driver's pressure from the slave cylinder means and permits the servo pressure, which is due to the force applied by the suspension element, to be added to the driver's pressure already applied, so that the servo effect is attributable only to the rotating force transmitted from the wheel to the vehicle with or without a component of weight.

BRIEF DESCRIPTION OF THE DRAWINGS

FIGS. 7, 8 and 9 illustrate in three conditions a preferred arrangement of servo piston and pressure-operated valve according to the invention, in a form thereof which is intended to obviate the potential instabilities to which the arrangement of FIGS. 1–6 may in some circumstances be susceptible.

DESCRIPTION OF THE PREFERRED EMBODIMENTS

Figure 1:
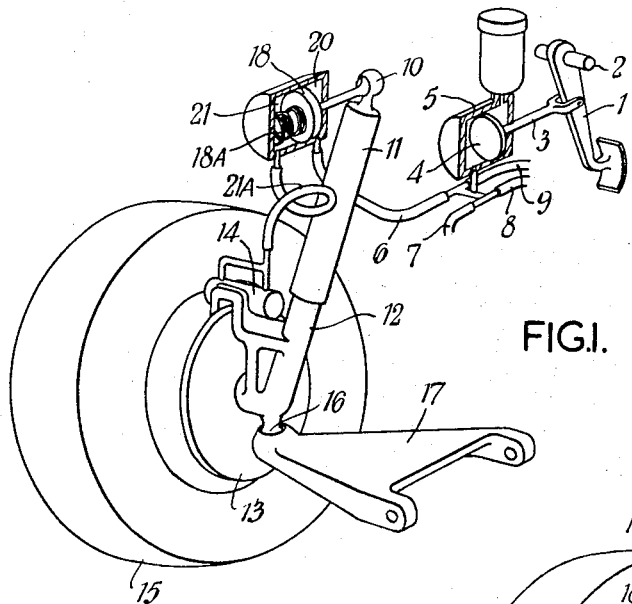
FIG. 1 is a schematic perspective view illustrating an off-side front automobile wishbone-type suspension and brake.

While the present invention is applicable to any braking system wherein it is contemplated to effect modulation of the braking by the retarding force on the vehicle due to braking, i.e., to control or limit the brake torque at the wheel to prevent skidding or to optimalize braking automatically having regard to the inevitably variable road adhesion, a particularly useful application of the present invention is made in heavy multi-wheel vehicles or undercarriages or in the braking of trailers or articulated vehicles.

Perhaps the clearest way to state the basis of the invention and its advantages, is to consider an actual sequence of events as they might occur in practice on the road. We shall consider only one wheel of a four-wheel vehicle; more complex considerations (e.g., those of six-wheeled articulated vehicles) should present no problems beyond the skills of the art.

No road is perfectly regularly smooth and it is very improbable that, over a journey's distance, it is of uniform surface frictionally. Because of irregularities and of varying surfaces, it is not possible to achieve maximal retardation by braking, of a vehicle running at a usual speed. The basic object of the invention is to afford maximal retardation without any particular driver's skill — and in this sense "maximal" means the practical rather than theoretical maximum. Known anti-skid systems, because they only operate in accordance with some of the parameters, fall considerably short of the maximum. The parameters with which the invention is concerned are those which are a measure of the actual retarding force, i.e., the reaction in the suspension system, set up by the wheel and transmitted to the vehicle. This can be quite different from the mere torque-reaction in the brake mechanism, i.e., the torque exerted between the brake shoes and brake drum or disk in a disk-type braking arrangement.

This latter parameter, when considered mechanically, is inadequate for maximum retardation as can be understood by considering the wheel to ride over an excrescence of the road. While mounting the excrescence, the wheel load is increased by reason of the inertia of the vehicle and therefore wheel adhesion increases. If brake torque is not proportionately increased, then full advantage is not being taken of the brake and maximum retardation is not achieved. The same "loss" arises in respect of the outer wheels when cornering. Now the wheel descends down from the excrescence, wheel load decreases, and if the brake torque is not reduced, the wheel will lock and adhesion will sharply decrease. Again, this is a "loss" of retardation, and again it may arise in cornering.

If the foregoing event be reproduced almost continuously, as it is in fact because all roads have vertical irregularity, and of course the effective loss is the same if a depression is encountered, then the total "loss" of retardation is substantial.

The general idea upon which the present invention is based, assumes that the advantages provided are, in practice, desirable only in forward motion; in reverse, ordinary braking by driver'pressure suffices. It should also be mentioned that whatever provision is made in a brake system should be applicable both to driven and undriven wheels and therefore should be such as to be neglected when considering a wheel or suspension system which is propulsively thrusting the vehicle. In this context, it may further be mentioned that in some applications of the invention, it is preferred that the suspension system be independent of the transmission system, so that different elements resist drive torque reaction and brake torque reaction.

Figure 2:
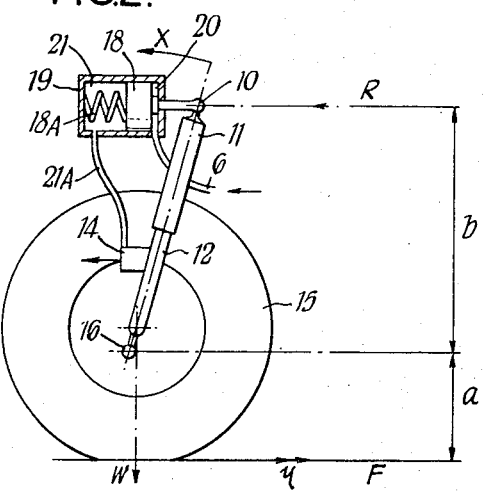
FIG. 2 is a diagram illustrating the forces operating in the FIG. 1 construction.

Referring now to the drawings, in FIGS. 1 and 2 is shown a brake pedal 1 pivotally mounted at 2, and through a rod 3 working the master piston 4 in master cylinder 5, of which the output is divided into pressure lines 6, 7, 8, 9 to each of the four wheels. Line 6 goes to one side 20 of a drag piston 18, the other side 21 of which is connected by a flexible hose 21A to the slave motor generally indicated at 14. The caliper-type slave 14 acts on the brake disk 13 which is fixed with the road wheel 15, the axle of which is integral or fixed with the lower telescopic element 12, operating in the cylinder 11, of the resilient suspension element. The element 12 is ball-joined at 16 to a suspension wishbone element 17, and the cylinder 11 is ball-joined at 10 to the rod of the drag piston 18. A compression spring 18A resists the drag piston 18. The drag cylinder is virtually fixed in the vehicle, and the drag piston rod or the ball joint at 10 may be directly but movably supported in the vehicle, to react the vertical wheel load.

Referring particularly to FIG. 2, the linear braking force or drag is represented at F, and is a product of the wheel load W and the coefficient of friction ($\mu$), or adhesion, between tire and road. Braking produces a moment X in the telescopic unit 11, 12, about the point 16. The vertical distance between the road and 16 being $a$, and between 16 and 10 being $b$, the reaction R of the point 10 on piston 18 is $F \times (a/b)$. The force R therefore determines the pressure operative in the slave 14. The force R is initiated by the driver applying brake pressure, whereupon (and according to the product F i.e. (W Y)) the pressure in 14 and therefore the brake torque, is augmented. If, however, F is decreased (for example by diminution of $\mu$ due to a patch of ice), the pressure in 14 is reduced at least to a value when it is mainly dependent on the master cylinder pressure in 20, and the brake torque is thus very much reduced. By selecting the force imposed by the spring 18A, the conditions upon which the augmentation of brake pressure depend can be selected.

Figure 3:
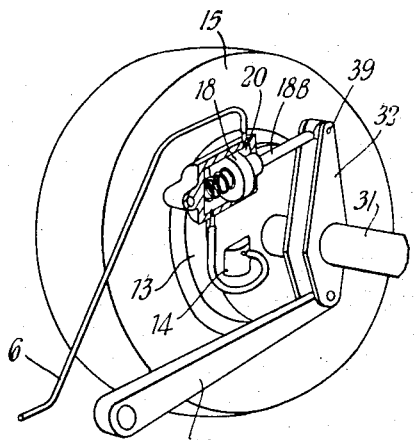
FIGS. 3 and 4 similarly illustrate a drag-link type of suspension with the spring removed for the sake of clarity.
Figure 4:
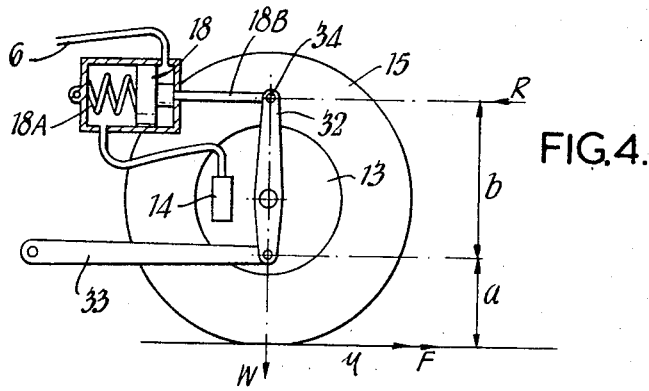

The same general principles apply in FIGS. 3 and 4. In FIG. 3, the master cylinder pressure is applied as before, by line 6 to chamber 20 of the drag cylinder. The drag piston 18 operates to apply pressure to the brake slave motor 14. In this example, the wheel is borne on an axle 31 suspended by a lever 32 of which one end is pivotally contained by a drag link 33, while the other end is pivotally connected at 34 to the rod 18B of the drag piston 18. The lever 32 may be inclined from the vertical so that it is sensitive to the weight which it carries. FIG. 4 indicates how the same indicated forces apply as in FIG. 2. Braking (the wheel 15 being assumed to be normally of counterclockwise sense of rotation) results in the force R augmenting the braking pressure in the slave 14 via the drag piston 18. Be it observed that, so far as the brake disk reaction is concerned in transmitting the brake torque, this results in its own contribution to movement in the lever 32, so that the force R could be analyzed in terms of the wheel drag on the road and the brake torque, these adding up effectively to the force R.

Figure 5:
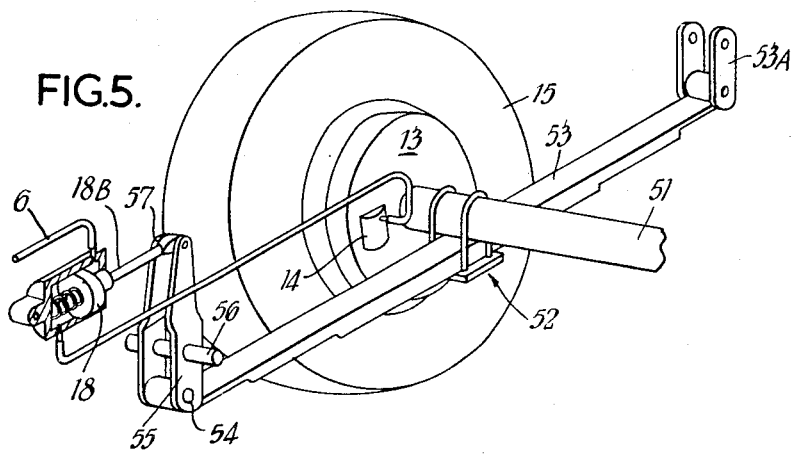
FIGS. 5 and 6 similarly illustrate a leaf semi-elliptical type of suspension.
Figure 6:
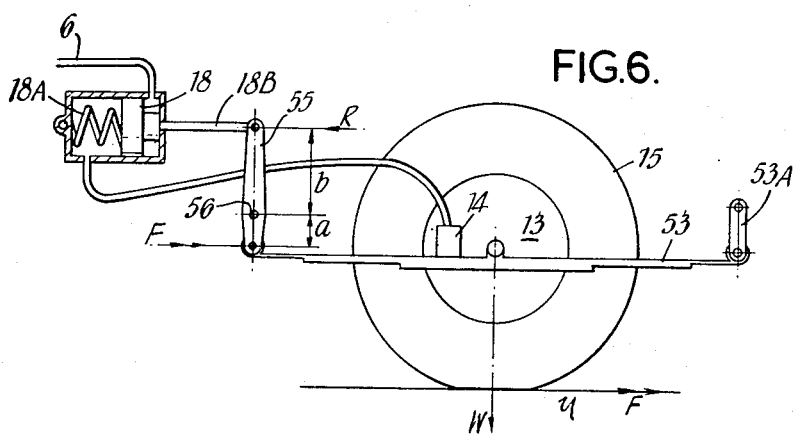

FIGS. 5 and 6 illustrate how the same underlying idea is applicable in a suspension system of the leaf-spring semi-elliptical kind. Here, the wheel 15 has its slave brake motor at 14 and the wheel is borne on the axle 51, the brakeplate 13 being fast on the axle. The axle 51 is rigidly attached at 52 to a leaf spring 53. This spring is linked by a pivotal shackle 53A to the vehicle chassis at one end, and at its other end 54 is pivotally attached to a lever element 55 (which, like lever 32, may be offset from the vertical) pivotally supported at 56 to the chassis, the other end of lever 55 being pivotally attached at 57 to the rod 18B of the drag position 18. Here again the drag piston being initially operated via line 6 from the master cylinder, is further forced by the horizontal drag (F) in the leaf spring 53 (vehicle motion being assumed to be to the left in the Figure), to increase the slave pressure in 14. If however the force F is insufficient (for example by the wheel 15 encountering an ice patch on the road) the spring 18A may counteract the master pressure and relieve the braking on the wheel 15.

In a mechanical example of this invention the torque and/or drag reaction is applied (for example as we see it applied in FIG. 1 at 10) to an end of a differentiating lever of which the other end is actuated by a brake pedal and the midpoint is connected to a mechanical brake shoe. Then, the force applied to the brake shoe is made dependent upon the force applied by the driver, plus or minus the force attributable to the drag in the suspension system.

Either in a hydraulic or mechanical system, there may be an augmentation or reduction of the servo effect. For example in FIG. 1, 3 or 5, the drag piston 18 may be replaced by a differential area piston, so that the driver's pressure application in the master cylinder may be increased by the action of the drag piston, or reduced, in a determined ratio.

There may be provided valve means, actuated by the movement of the brake pedal or in a shunt line from the line 6, so that the pressure effect of the drag piston is, so to speak, by-passed and the braking restored entirely to the control of the driver; this may be arranged to result from extreme pressure being exerted by the driver. Such a valve will be seen in FIG. 7.

The line 6 may be connected by a coupling to the brake system of a trailer (or rear wheels of an articulated vehicle) and the wheels so controlled may be arranged to be locked almost entirely by the servo or relay effect of the drag (or brake torque). Since such a system may quite easily be preset as to its operation, it may be arranged that trailer brakes are relieved at a lower value of drag than main vehicle wheels — or a higher, as may be deemed to be desirable. Moreover, any such articulated connection may be arranged, at the coupling, to be throttled or cut off, so that trailer or articulated section brakes are relieved in the event of a jack-knife incident.

When the invention is applied to mechanical braking, it is preferable to apply it to symmetrically disposed brake shoes. Thus, two opposed shoes may be directly connected to the driver's control and two other opposed shoes be operated by the "drag-servo" system above indicated. In such a case it may be arranged that the directly operated shoes are virtually incapable of locking the wheel in any foreseeable conditions: and the servo-actuated shoes are effective in the threshold of drag which extends between the minimum conditions covered by the direct shoes and the maximum of locking effect. This can be arranged by selecting the geometry in the linkage of the system or by selecting the effective area of the respective shoes, or some mechanical detail such as the shoe operating cam profile.

FIG. 7 illustrates the device in the "rest" condition.

FIG. 8 differs from FIG. 7 in that the fluid spaces are shown with the fluid pressure indicated by "+" marks, representing master-cylinder brake pressure only, the secondary piston and the valve being partially moved.

Figure 9:
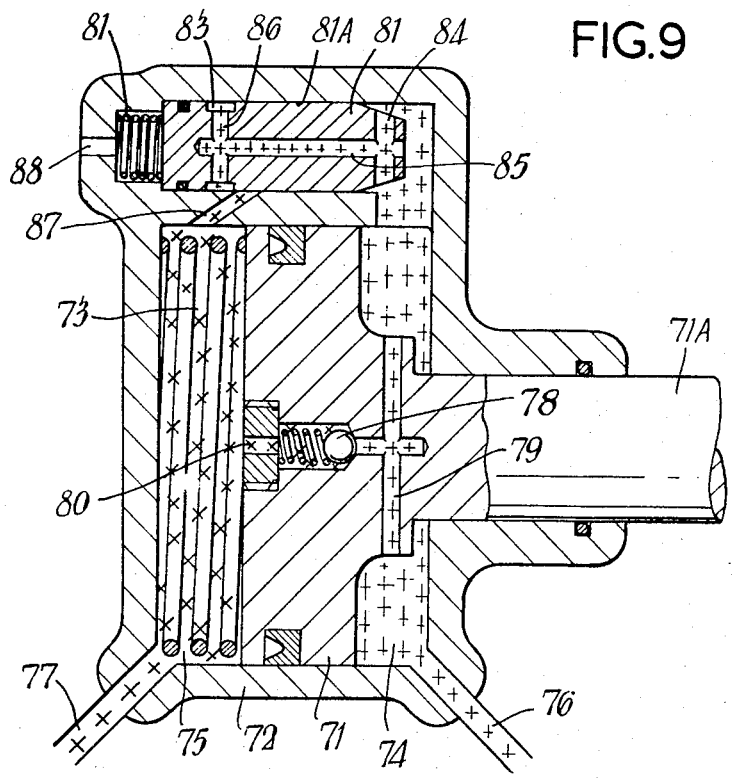

FIG. 9, with master-cylinder pressure spaces filled by "+" marks, and the mechanically fed-back pressure plus the master-cylinder pressure indicated by "x" marks, and with the spool valve appropriately shifted, indicates a maximal brake-pressure situation.

FIG. 7 shows a piston 71 on a rod 71A which is mechanically responsive to feed-back resulting from road drag, axially movable in a cylinder 72, and acted upon by a spring 73, to force the piston into contact with one end wall of the cylinder and yet to provide two hydraulic chambers 74 and 75, one either side of the piston 71, chamber 74 being in communication with the brake master-cylinder by line 76, and chamber 75 being in communication with the slave cylinder or cylinders by line 77. Through the center of the piston 71, a non-return valve 78 connects chamber 74 with chamber 75 by drillings 79 and 80.

In another cylinder 81A a pressure-responsive spool valve 81 intrudes so that it is exposed to the pressure in the chamber 74, and is urged against that pressure by a spring 82 (the force and rate of which control the operation of the system) acting on the opposite end of the spool 81 which end is open to, and therefore also urged by, atmospheric pressure by a drilling 88 in the end of the cylinder 81A. In the spool 81, an annulus 83 and drillings 84, 85 and 86 connect the chamber 74 with chamber 75 by means of a duct 87 in the wall between the two cylinders 72 and 81A. The fluid passage through the valve and ducting is of such capacity as not to produce any significant pressure-drop when the valve is full open (as in FIG. 7).

In FIG. 8, the brake pedal is just being depressed and fluid pressure (indicated by "+" signs) is building up in the system. Without movement of the piston 71, or with only such small movement as is shown, pressure builds up in chamber 75 through 76, 84, 85, 86, 83, 87 and the brakes are being applied. The spool valve 81 is now subject to increasing hydraulic pressure opposed to spring 82 and atmospheric pressure, and is beginning to move or is biased to move to the left, progressively shutting off the duct 87. At the same time the feed-back from the braking torque is beginning to be effective as thrust (to the left in the Figure) on the piston rod 71A against the spring 73 (hence the indication in FIG. 8 of some small movement).

FIG. 9 shows an ultimate condition which arises when the braking feed-back is operative. The spool 81 has shifted fully and entirely cut off duct 87. Maximum braking torque is now on, and adds to the pressure buildup in chamber 75. Differential pressure across the piston 71, in one sense of direction, keeps the valve 78 fully shut.

When the pressure (in 76 and 74) from the mastercylinder reaches a chosen level the fluid pressure acting on the valve 81 causes the valve 81 to close off the fluid connection to 87. Mechanical thrust applied through rod 71A to piston 71 will now cause a proportional increase in the fluid pressure in the actuator side of the system thus applying a servo assistance to the driver applied force. If the spring 73 load were momentarily to exceed the mechanical thrust from the wheel drag (through 71A) when for example wheel drag is negated by loss of wheel/road adhesion, reverse movement of the piston 71 would result, and return the system to driver-applied pressure only, and transiently, less that pressure (which may be suitably adjusted) required to unseat the ball valve 78, to permit the through passage of fluid corresponding to the piston movement. When the master-cylinder pressure is reduced or wholly relieved (by the driver releasing his pedal) the valve 81 is moved to the right re-establishing communication between chambers 75 and 74 irrespective of any feedback force then imposed. As the piston 71 returns (to the right in the drawings) by reason of reduction of road wheel reaction the unseated ball valve 78 allows fluid to flow (leftward) into the actuator end of the cylinder 72 thus keeping it primed with fluid even while the (pressure operated) spool valve is in its cut-off position.

Shown in the piston, though not essentially so located, the non-return valve 78, illustrated and referred to as a ball valve, additionally provides a safety feature: should the piston 71 at any time be at full deflection (i.e. to the left) when the duct 87 is closed, an increase in the pressure applied by the mastercylinder may be passed to the actuator through the ball valve 78.

Although various minor modifications might be suggested by those versed in the art, we wish to embody within the scope of the patent warranted hereon all such modifications as reasonably and properly come within the scope of our contribution to the art.

I claim as my invention:

1. In a fluid-pressure vehicle brake system of the kind including a master piston exerting driver's fluid pressure and a brake-actuating slave cylinder means responsive to said fluid pressure, the improvement of vehicle suspension means in which suspended loads create servo-braking pressure augmenting operator-generated braking pressure and including a vehicle-suspension element which is movable in response to the reaction force between a vehicle wheel and the ground occasioned by braking, a secondary servo piston arranged to generate servo pressure proportional to such reaction force in response to such movement, whereby such servo pressure is added to driver's pressure when the servo pressure exceeds the driver's pressure.

2. A system according to claim 1, constituted and arranged so that the driver's pressure moves the servo piston in all relatively low-pressure brake applications, whereby the servo piston transmits such pressures to the slave cylinder means.

3. In a system according to claim 1 and further characterized by a resiliently resistant valve through which the driver's pressure bypasses the servo piston in all relatively low-pressure brake applications and being movable when relatively high driver's pressure is applied, thereby cutting driver's pressure off from the slave cylinder means and conditioning the servo piston to apply the servo pressure in addition to the driver's pressure.

4. In a system according to claim 3, and further characterized by a resiliently loaded one-way valve opening to permit flow from the master to the slave in non-normal conditions.

5. In a system according to claim 4, and further characterized by said resiliently resistant valve comprising a pressure-responsive speed valve which controls passage of driver's pressure from master to slave without movement of the servo piston, and which spool valve is movable against resilience, so as to exert such control according to gauge driver's pressure up to a value whereat such passage is cut off, whereupon the slave pressure is dependent n that which is generated by the servo piston as a measure of wheel drag.

6. In a system according to claim 5 in which the said spool valve is a piston like shuttle valve loaded by a spring and exposed so that atmospheric pressure acts with the spring in one sense of direction while the driver's pressure acts in the opposite sense and is effective in terms of gauge pressure.

7. In a system according to claim 6 in which the servo piston is urged in the sense which is opposed to driver's pressure by a spring.

8. In a fluid-pressure vehicle brake system of the kind including a master piston exerting driver's fluid pressure which is transmitted to brake-actuating slave cylinder means, the improvement of vehicle suspension means in which suspended loads create servo-braking pressure augmenting operator-generated braking pressure and including a vehicle-suspension element bearing part of the weight of the vehicle and arranged to be movable in response to the drag of at least one vehicle wheel, said element being connected so as mechanically to move as a function of the drag, a servo piston in a servo cylinder through which the driver's pressure is transmitted from master to slave with the servo piston intervening in the flow, the effect of the drag on the servo piston being such as to add such servo pressure to the driver's pressure when there is generated a servo pressure between the servo piston and slave means greater than the driver's pressure.

9. In a system according to claim 8 in which the suspension element applies force to the servo piston as a function of the vertical load sustained by the element.

* * * * *